United States Patent
Ueno

(10) Patent No.: US 8,370,014 B2
(45) Date of Patent: Feb. 5, 2013

(54) CONTROL APPARATUS AND METHOD FOR CONTROLLING A HYBRID VEHICLE

(75) Inventor: Munetoshi Ueno, Atsugi (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 158 days.

(21) Appl. No.: 12/863,053

(22) PCT Filed: Feb. 27, 2009

(86) PCT No.: PCT/IB2009/000428
§ 371 (c)(1),
(2), (4) Date: Jul. 15, 2010

(87) PCT Pub. No.: WO2009/109839
PCT Pub. Date: Sep. 11, 2009

(65) Prior Publication Data
US 2010/0312427 A1 Dec. 9, 2010

(30) Foreign Application Priority Data
Mar. 6, 2008 (JP) ................................. 2008-056666

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl. .......................... 701/22; 477/5; 180/65.265

(58) Field of Classification Search .................... 701/22; 180/65.1, 65.21, 65.25, 65.275, 65.31; 477/3, 477/34

See application file for complete search history.

(56) References Cited

U.S. PATENT DOCUMENTS

| 5,327,987 | A  | * | 7/1994  | Abdelmalek ............... 180/65.25 |
| 5,982,045 | A  | * | 11/1999 | Tabata et al. ..................... 290/17 |
| 6,554,088 | B2 | * | 4/2003  | Severinsky et al. ........ 180/65.23 |
| 7,014,592 | B2 | * | 3/2006  | Wiethe et al. ................. 477/120 |
| 7,021,409 | B2 | * | 4/2006  | Tamor ......................... 180/65.25 |
| 2006/0060399 | A1 | * | 3/2006 | Tabata et al. ................. 180/65.2 |
| 2006/0243501 | A1 |   | 11/2006 | Hidaka |
| 2007/0227791 | A1 |   | 10/2007 | Ueno |
| 2007/0284161 | A1 |   | 12/2007 | Ohno |
| 2008/0091314 | A1 |   | 4/2008  | Hayashi et al. |
| 2008/0154455 | A1 |   | 6/2008  | Hidaka et al. |
| 2008/0275601 | A1 |   | 11/2008 | Saito et al. |
| 2008/0293538 | A1 |   | 11/2008 | Saito et al. |

FOREIGN PATENT DOCUMENTS

CN 101028819 A 9/2007
JP 2001-295679 A 10/2001

(Continued)

*Primary Examiner* — Thomas Black
*Assistant Examiner* — Isaac Smith
(74) *Attorney, Agent, or Firm* — Young, Basile, Hanlon & MacFarlane, P.C.

(57) ABSTRACT

A control apparatus and method of controlling a hybrid vehicle are taught herein. The vehicle selectively switches between an EV mode wherein the vehicle travels by only a driving force produced by the motor/generator when an accelerator opening is less than or equal to an engine-stop line or a HEV mode wherein the vehicle travels by at least a driving force produced by the engine the accelerator opening exceeds the engine-stop line. A transition from the HEV mode to the EV mode is executed when the accelerator opening becomes less than or equal to the engine-stop line during the HEV mode and a given delay time has expired. The delay time is set to a shorter time as an accelerator return speed decreases.

18 Claims, 6 Drawing Sheets

FOREIGN PATENT DOCUMENTS

| | | | |
|---|---|---|---|
| JP | 2004-162534 A | 6/2004 | |
| JP | 2006-132337 A | 5/2006 | |
| JP | 2006-152867 A | 6/2006 | |
| JP | 2006-306328 A | 11/2006 | |
| WO | 2009/109825 A1 | 9/2009 | |
| WO | 2009/109826 A1 | 9/2009 | |

* cited by examiner

CONTROL APPARATUS AND METHOD FOR CONTROLLING A HYBRID VEHICLE

CROSS-REFERENCE TO RELATED APPLICATION

This application claims priority from Japanese Patent Application Serial No. 2008-056666, filed Mar. 6, 2008, which is incorporated herein in its entirety by reference.

TECHNICAL FIELD

The present invention relates to controlling a hybrid vehicle.

BACKGROUND

A known hybrid vehicle has an engine, a motor/generator) used for driving (or propelling) the vehicle, for starting the engine and for power generation and a clutch that is disposed between the engine and the motor/generator. When such a hybrid vehicle is performing regenerative braking (regenerative deceleration) by means of the motor/generator, a loss of electric energy regeneration, which may occur due to engine friction, can be minimized by disengaging the clutch to disconnect the engine from a driving power transmission and the motor/generator, thereby ensuring an amount of electric energy regeneration at the maximum efficiency.

Such a hybrid vehicle, which includes a clutch between an engine and an electric motor/generator, has been disclosed in Japanese Patent Provisional Publication Nos. 2004-162534 and 2006-306328. For vehicle propulsion, such hybrid vehicles switch between operation in an EV mode (electric drive), in which only the electric motor/generator is used as the propelling power source, and an HEV mode (hybrid drive), in which at least the engine is used as the propelling power source.

In setting an operating range (an electric-drive operating range) of the hybrid vehicle, a hysteresis for mode-switching between the EV and HEV modes is provided to avoid repeated starting and stopping of the engine resulting from switching between the EV and HEV modes in response to frequent driver accelerator operations. For instance, assuming that the electric-drive operating range (the EV operating range) is defined by two parameters, namely, vehicle speed and accelerator opening, a threshold value for a transition from the EV mode to the HEV mode is set as an engine-start line and a threshold value for a transition from the HEV mode to the EV mode is set as an engine-stop line.

BRIEF SUMMARY

Embodiments of a control apparatus and method for controlling a hybrid vehicle are taught herein. The hybrid vehicle includes an engine, a motor/generator used for vehicle propulsion and power generation, a clutch interleaved between the engine and the motor/generator for enabling and disabling torque transmission by engagement and disengagement of the clutch and an acceleration demand detection device configured to detect a driving force demand from a driver. One exemplary embodiment of a control apparatus comprises a controller configured to selectively switch between an EV mode, in which the vehicle travels by only a driving force produced by the motor/generator with the clutch disengaged when the driving force demand is less than or equal to an engine-stop criterion value, and an HEV mode, in which the vehicle travels by at least a driving force produced by the engine with the clutch engaged when the driving force demand is greater than the engine-stop criterion value. The controller in this embodiment is also configured to set a delay time based on a driving force demand change rate and to execute a transition from the HEV mode to the EV mode when the driving force demand becomes less than or equal to the engine-stop criterion value during the HEV mode and after the delay time has expired.

Details and variations of this embodiment and other embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Regarding hybrid vehicles such as those described in Japanese Patent Provisional Publication Nos. 2004-162534 and 2006-306328 that employ both a clutch interleaved between an engine and a motor/generator and a fixed ratio automatic transmission whose number of speeds is limited or finite, an engine stop and an engine start are repeatedly executed due to release and depressing of an accelerator pedal. For example, after execution of an engine start due to vehicle acceleration, the clutch is disengaged upon release of the accelerator pedal to initiate a transition to the EV mode, the operating range enters an EV operating range, and the engine is stopped. Then, the presence of a requirement for vehicle re-acceleration by depressing the accelerator pedal just after the transition to the EV mode causes the engine to restart, and the operating range reenters the HEV operating range. This increases the fuel consumption rate due to the high responsiveness to acceleration demand.

Embodiments of the invention, however, improve responsiveness by reducing the fuel consumption rate. Hereinafter, certain embodiments of the invention are explained in detail with reference to the drawings.

Figure 1:
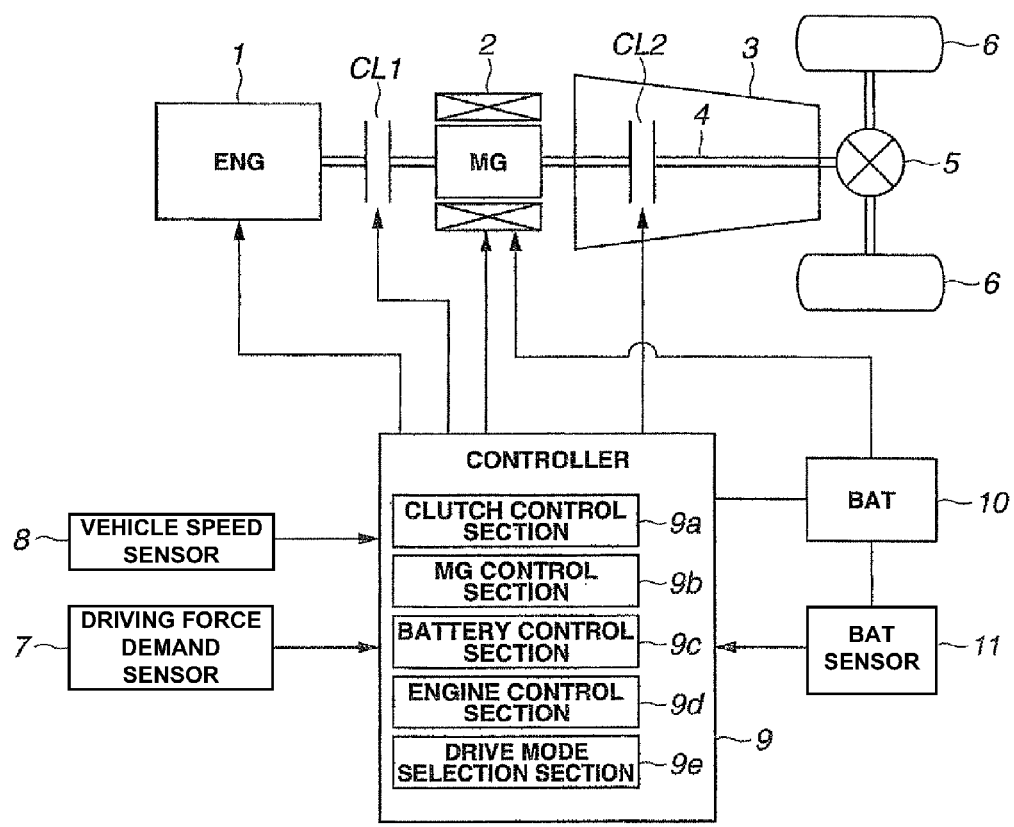
FIG. 1 is a general system diagram illustrating a hybrid vehicle with a clutch control apparatus according to embodiments of the invention.

As seen in FIG. 1, the hybrid vehicle includes an engine 1, a motor/generator (MG) 2 and a transmission 3. A first clutch CL1 is interposed between engine 1 and motor/generator 2 for enabling and disabling the transmission of a driving force and a friction from engine 1. Also provided is a second clutch CL2, which is interposed between motor/generator 2 and drive road wheels 6, for controlling the driving-force transmission between the motor/generator 2 and the drive wheels 6. The second clutch CL2 is not necessarily a separatelyincluded clutch. Several friction elements of a plurality of frictional engagement elements of the transmission 3, selectively engaged depending on a selected one of range gear positions of transmission 3, preferably serve as the second clutch CL2. Desirably, but not necessarily, the transmission is a stepped transmission 3. A battery 10 is connected to motor/generator 2 for the purpose of delivery and receipt of electric power. In the presence of electric power supply from battery 10 to motor/generator 2, the motor/generator is usable as an electric motor. That is, drive wheels 6 are driven by the motor/generator through transmission 3, a propeller shaft 4 and a differential gear 5.

Conversely, motor/generator 2 can be rotated by the torque transmitted from drive wheels 6 through differential gear 5, propeller shaft 4 and transmission 3 to the motor/generator 2, and thus motor/generator 2 also serves as a dynamo-electric generator. The generated electric power is stored in battery 10. That is, motor/generator 2 functions as a generator as well as an electric motor.

First clutch CL1, second clutch CL2 and motor/generator 2 are controlled by a controller 9. The input interface of controller 9 is connected to various sensors, namely, an acceleration (or driving force) demand sensor 7 configured to detect an acceleration or driving force demand, a vehicle speed sensor 8 configured to detect traveling speed of the vehicle, and the like. By example, and without limitation thereto, the accelerator demand sensor 7 is described hereinafter as accelerator position sensor configured to detect an accelerator opening APO as a measure of the desired acceleration or driving force demand from the driver. Also provided is a battery sensor 11 attached to battery 10 for measuring a state of charge (SOC) of battery 10 (a charging capacity). The battery sensor 11 feeds information about the measured SOC to controller 9. Controller 9 controls, based on input signals from these sensors, engine 1, first clutch CL1, motor/generator 2 and second clutch CL2.

Controller 9 is equipped with a clutch control section 9a, an MG control section (a motor/generator control section) 9b, a battery control section 9c, an engine control section 9d and a drive mode selection section 9e. The controller 9 is implemented by, for example, a conventional engine control unit such as is known in the art. It can thus be a microcomputer including a random access memory (RAM), a read-only memory (ROM) and a central processing unit (CPU), along with various input and output connections. Generally, the control functions described herein and associated with the respective control sections are performed by execution by the CPU of one or more software programs stored in ROM. Of course, some or all of the functions can be implemented by hardware components. Moreover, although several control sections are shown as being part of an integrated controller 9, the functions for the sections could be performed by a plurality of logically-linked controllers.

Drive mode selection section 9e is configured to selectively switch between an EV mode (an electric drive mode), in which first clutch CL1 is disengaged for disconnecting engine 1 from motor/generator (MG) 2 and thus the vehicle travels by only the driving force produced by motor/generator 2, and an HEV mode (a hybrid drive mode), in which first clutch CL1 is engaged for connecting engine 1 to motor/generator 2 and thus the vehicle travels by the driving force produced by engine 1 and/or motor/generator 2. The controller 9 is also configured to control, based on vehicle speed and accelerator opening, a shift position of transmission 3, utilizing a map described later.

MG control section 9b is configured to operate the motor/generator 2 in a power running mode or in a regenerative mode, depending on the set drive mode and required driving force. Clutch control section 9a is configured to control engagement and disengagement of first clutch CL1 and engagement and disengagement of second clutch CL2, depending on the drive mode set by the drive mode selection section 9e. Battery control section 9c is configured to receive input information about the measured SOC of battery 10, measured by battery sensor 11, and is also configured to inform the drive mode selection section about whether the measured SOC exceeds a specified charge value and should thus be inhibited to avoid excessive regeneration.

Drive mode selection section 9e is further configured to execute a transition from the HEV mode to the EV mode when the driver-required driving force (indicated for example by the accelerator opening APO) becomes less than or equal to an engine-stop criterion value (the line segment, corresponding to the engine-stop criterion value, is hereinafter referred to as an "engine-stop line") during the HEV mode and after a delay time has expired. The drive mode selection section 9e is also configured to set the delay time to a shorter time as a rate of a speed of change in driver demand, also called a driving force demand change rate, decreases. For example, the delay time could be shortened as an accelerator return speed (an absolute value of a speed of change in accelerator opening APO, |ΔAPO|) decreases. Such setting/alteration of the delay time may be performed by means of controller 9 itself.

Figure 2:
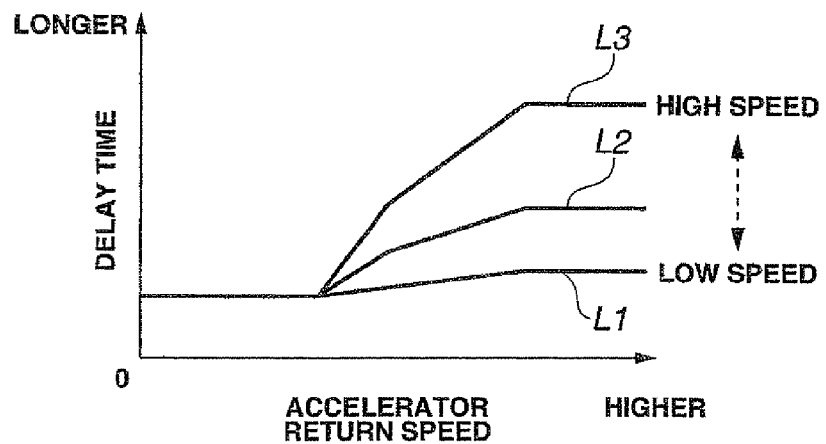
FIG. 2 is a map used for control executed within the clutch control apparatus of a first embodiment of the invention.

FIG. 2 is a map used for control executed within the drive control apparatus (i.e., controller 9) of the hybrid vehicle of a first embodiment of the invention. As can be seen from the map shown in FIG. 2, the delay time is specified or defined by both the accelerator return speed and the vehicle speed. The delay time is set to decrease as the accelerator return speed decreases. Additionally, at a low vehicle speed, the delay time is defined as a short delay time, specified by the line L1. At a middle vehicle speed, the delay time is defined as an intermediate delay time, specified by the line L2. At a high vehicle speed, the delay time is defined as a long delay time, specified by the line L3.

Figure 3:
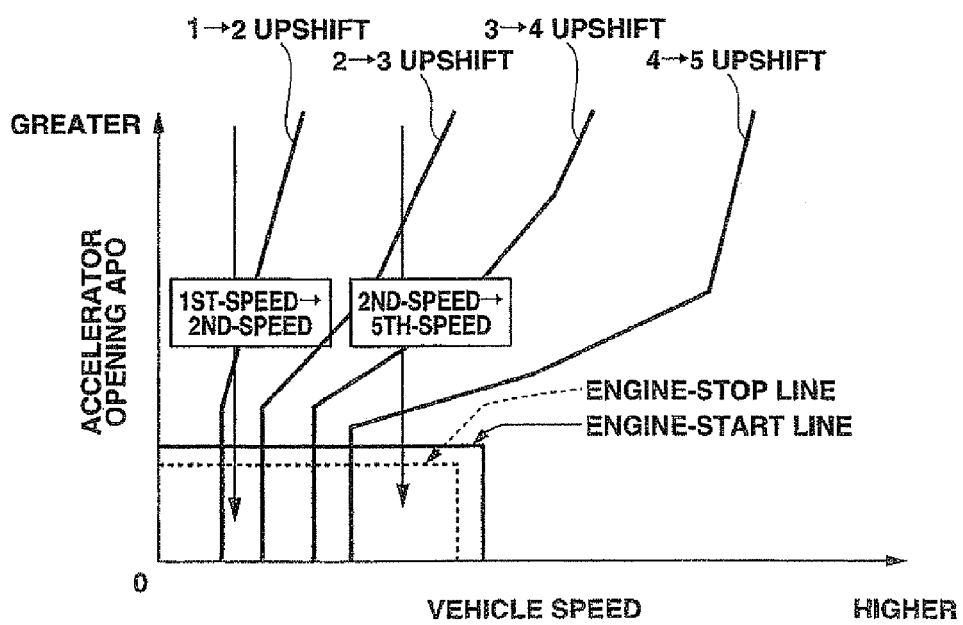
FIG. 3 is a map used for control executed within the clutch control apparatus of the first embodiment.

As seen in FIG. 3, a map shows the relationship between the accelerator opening and the vehicle speed, and further shows upshift lines. For instance, when passing through the 1→2 upshift line, the number of upshifts is small (i.e., only one upshift), and therefore it is possible to set the delay time to a short time, even when the accelerator return speed is fast. In contrast, when upshifting from a second-speed position to a fifth-speed position, the shifting action must be made to pass through the 2→3 upshift line, the 3→4 upshift line, and the 4→5 upshift line, in that order. In such a case, three total upshifts are necessary. Therefore, during vehicle driving at high speeds, it is desirable to set the delay time to a longer time. The settings of the vehicle-speed-dependent delay-time characteristic lines L1-L3 in the map of FIG. 2 are based on the above-mentioned criteria.

Figure 4:
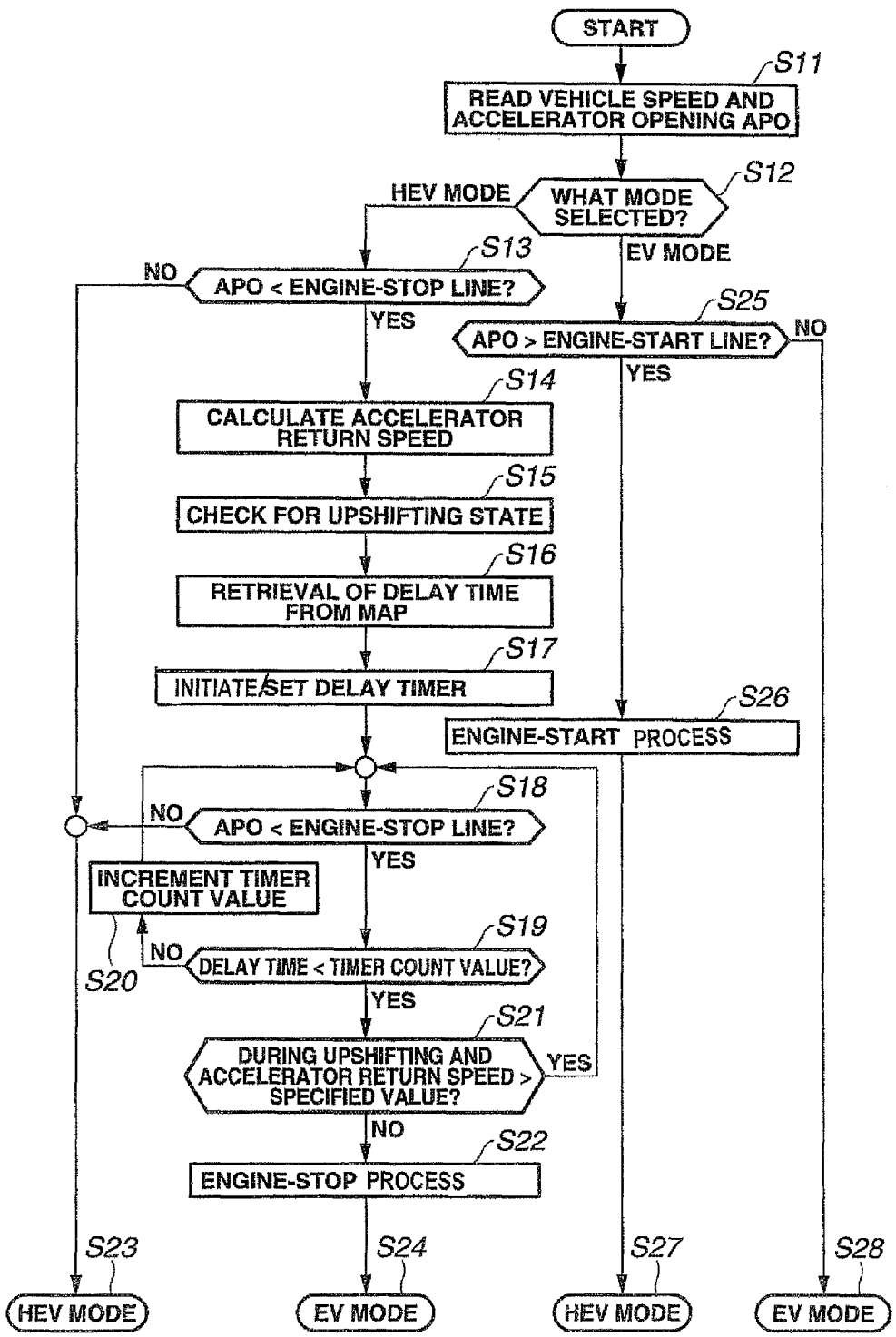
FIG. 4 is a flowchart illustrating a control routine executed using the map of FIG. 2.

FIG. 4 is a flowchart illustrating the control routine executed using the map of FIG. 2. As can be seen in FIG. 4, at step S11, input information about the vehicle speed and the accelerator opening is read. Next, at step S12, a check for a drive mode is made. When the current drive mode is the HEV mode, the routine proceeds to step S13, at which a check is made to determine whether the accelerator opening is less than the engine-stop line (the engine-stop criterion value). When the decision result of step S13 is negative (NO), the routine proceeds to step S23 at which the drive mode is maintained in the HEV mode. One execution cycle of the routine terminates.

Conversely, when the decision result of step S13 is affirmative (YES), meaning that the accelerator position is less than or equal to the engine-stop line, the routine proceeds to step S14. At step S14, the accelerator return speed is calculated and is stored in the memory section. Thereafter, at step S15, a determination for an upshifting state is made by arithmetic and logic operation. When the next gear stage (the next gear position) is greater than the current gear stage (the current gear position), it is determined that the transmission is in an upshifting state. At step S16, the delay time is calculated or retrieved based on both the vehicle speed and the calculated accelerator return speed using the map of FIG. 2. Thereafter, at step S17, a delay timer is set to initiate its timer counting operation.

At step S18, a check is made to determine whether the accelerator opening is less than the engine-stop line. When the decision result of step S18 is negative (NO), the routine proceeds to step S23 to execute mode-setting to the HEV mode, and then one execution cycle of the routine terminates. Conversely, when the decision result of step S18 is affirmative (YES), meaning that the accelerator position is less than or equal to the engine-stop line, the routine proceeds to step S19. At step S19, a check is made to determine whether the delay time is less than the timer count value. When the decision result of step S19 is negative (NO), the timer count value is incremented (see step S20), and then the routine returns to step S18 for rechecking and comparing the accelerator opening to the engine-stop line. Conversely, when the decision result of step S19 is affirmative (YES), that is, in the case of delay time<timer count value, the routine advances to step S21. At step S21, a check is made to determine whether two conditions, namely, the first condition where the transmission is in an upshifting state, and the second condition where the accelerator return speed is greater than a specified value, are satisfied. When the decision result of step S21 is affirmative (YES), the routine returns from step S21 to step S18. Conversely, when the decision result of step S21 is negative (NO), such as when the accelerator return speed is less that or equal to the specified value, the routine proceeds to step S22. At step S22, an engine-stop process is executed in which clutch control section 9a operates to disengage first clutch CL1, and then engine control section 9d stops the engine 1. Lastly, at step S24, the drive mode is set to the EV mode. In this manner, one execution cycle of the routine terminates.

In contrast to the above, when it is determined that the current drive mode is the EV mode in step S12, the routine proceeds from step S12 to step S25. At step S25, a check is made to determine whether accelerator opening APO is greater than an engine-start line, corresponding to an engine-start criterion value. When the decision result of step S25 is negative (NO), the routine proceeds to step S28 at which the drive mode remains in the EV mode. One execution cycle of the routine terminates. Conversely, when the decision result of step S25 is affirmative (YES), meaning that the accelerator opening is greater than the engine-start line, the routine advances to step S26, at which an engine-start process is done. Responsive to the engine-start process, clutch control section 9a operates to engage first clutch CL1, and then engine control section 9d executes engine-start processing. Lastly, at step S27, the drive mode is set to the HEV mode. In this manner, one execution cycle of the routine terminates.

Figure 5:
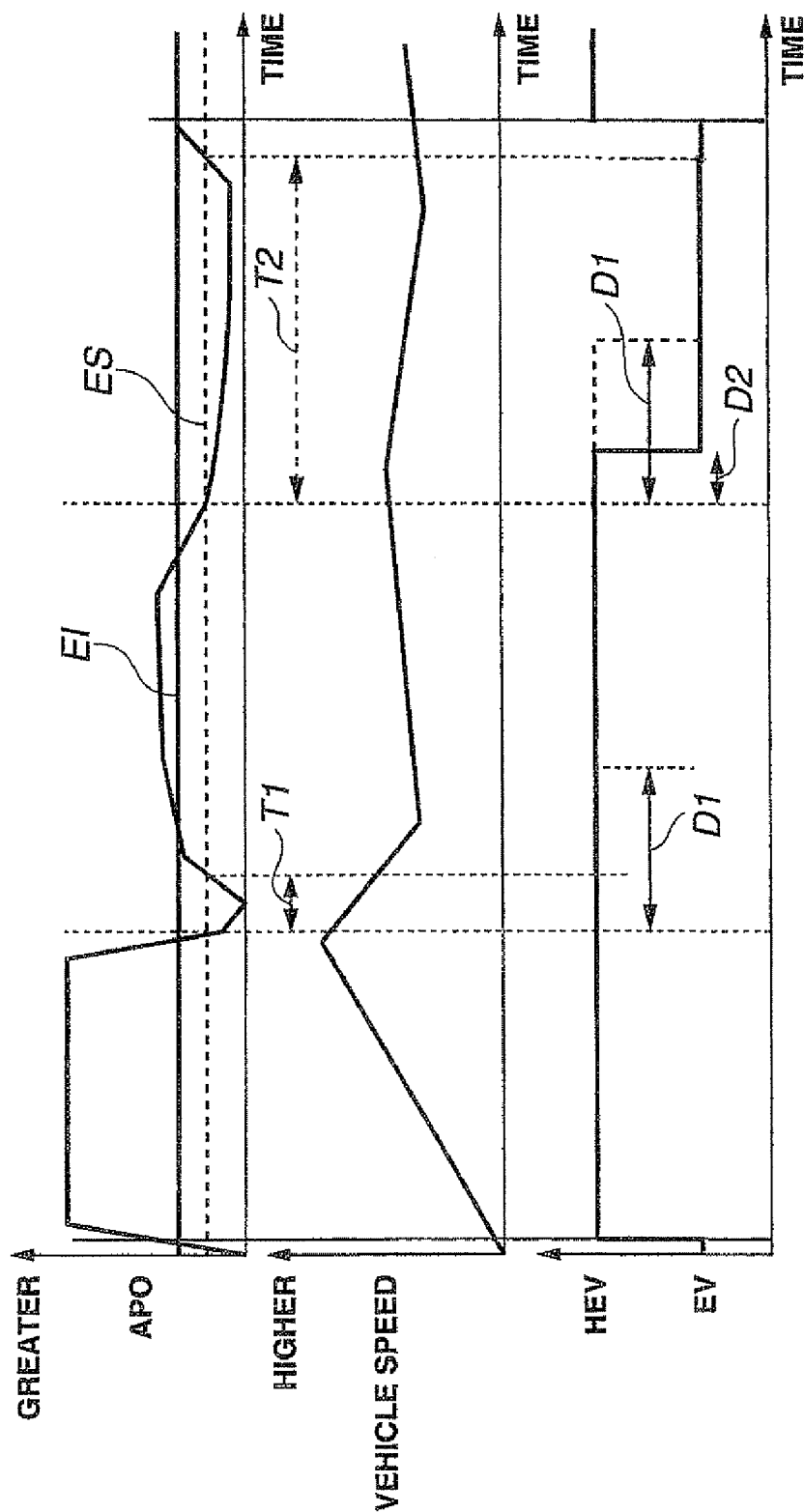
FIG. 5 shows timing charts for explaining the drive control performed by the clutch control apparatus of the first embodiment.

As seen in FIG. 5, the upper timing chart illustrates the relationship between accelerator opening APO and time, the intermediate timing chart illustrates the relationship between vehicle speed and time, and the lower timing chart illustrates the relationship between the drive mode and time. Regarding the upper chart, an engine-start line EI is indicated by a solid line, whereas an engine-stop line ES is indicated by a broken line. When rapidly decreasing accelerator opening APO, the accelerator return speed |ΔAPO| becomes fast. Thus, the given delay time is set to a long delay time D1. In such a case, a time interval T1, during which accelerator opening APO is less than or equal to the engine-stop line ES (the engine-stop criterion value), tends to be shorter than delay time D1. Hence, there is no occurrence of a transition from the HEV mode to the EV mode. Thus, even in a situation where the driver's accelerator-pedal depression and release are repeatedly executed, or even in a situation where the accelerator pedal has been rapidly released for a rapid deceleration and thereafter the driver's accelerator-pedal depression is anticipated due to a requirement for vehicle re-acceleration, it is possible to suppress an engine stop and a subsequent engine start from being repeatedly executed due to switching between the two different drive modes.

Next, when moderately decreasing accelerator opening APO, the accelerator return speed |ΔAPO| becomes slow. Thus, the given delay time is set to a short delay time D2. In such a case, a time interval T2, during which accelerator opening APO is less than or equal to the engine-stop line ES (the engine-stop criterion value), tends to be longer than delay time D2. Hence, there is a transition from the HEV mode to the EV mode. Thus, when the accelerator pedal has been released with a stable driver's accelerator-pedal operation, the control apparatus of the embodiment permits transition to the EV mode. As discussed above, it is possible to lengthen both the travel distance and traveling time during which the vehicle is traveling at the EV mode by changing the delay time depending on the accelerator return speed |ΔAPO|. This contributes to the improved fuel economy. For the sake of simplicity of the disclosure and drawings, only a single-step change in the delay time with respect to accelerator return speed |ΔAPO| is exemplified. In lieu thereof, the delay time may be changed in a linear fashion depending on the accelerator return speed |ΔAPO|. For the purpose of simplifying the drive control, a plurality of steps for delay-time changes are provided, and thus the delay time may be changed in a stepwise manner.

Figure 6:
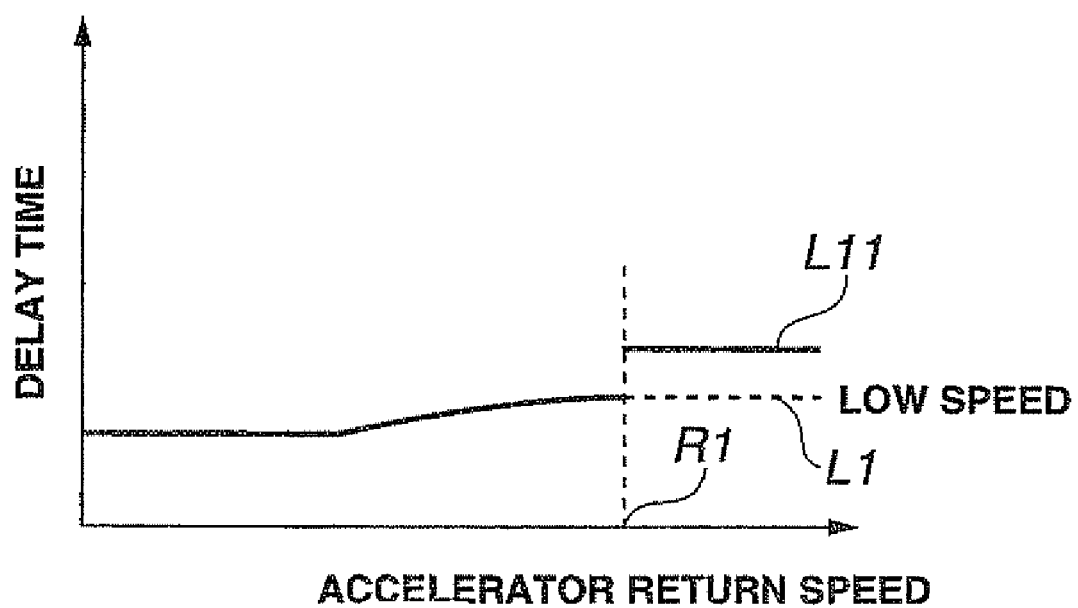
FIG. 6 is a map used for control executed within a clutch control apparatus of a second embodiment of the invention.

In the drive control apparatus (i.e., controller 9) of the second embodiment, the hybrid vehicle as shown in FIG. 1 uses the map shown in FIG. 6 for control. As can be seen from FIG. 6, the map is a characteristic map that is configured to set the delay time to a long delay time when the accelerator return speed |ΔAPO| exceeds a specified value R1. As shown in FIG. 6, when the accelerator return speed |ΔAPO| is less than or equal to the specified value R1, the previously-described line L1, which is suited for low vehicle speeds, is used, such that the delay time is set to a short delay time. Conversely, when the accelerator return speed |ΔAPO| exceeds the specified value R1, and, furthermore, the transmission is in an upshifting state, a line L11 is used to set the delay time to a constant delay time that is longer than the short delay time specified by the line L1. In this manner, the delay time is variably set depending on the accelerator return speed. Hence, it is possible to suppress a transition of the drive mode from occurring during an upshift.

Figure 7:
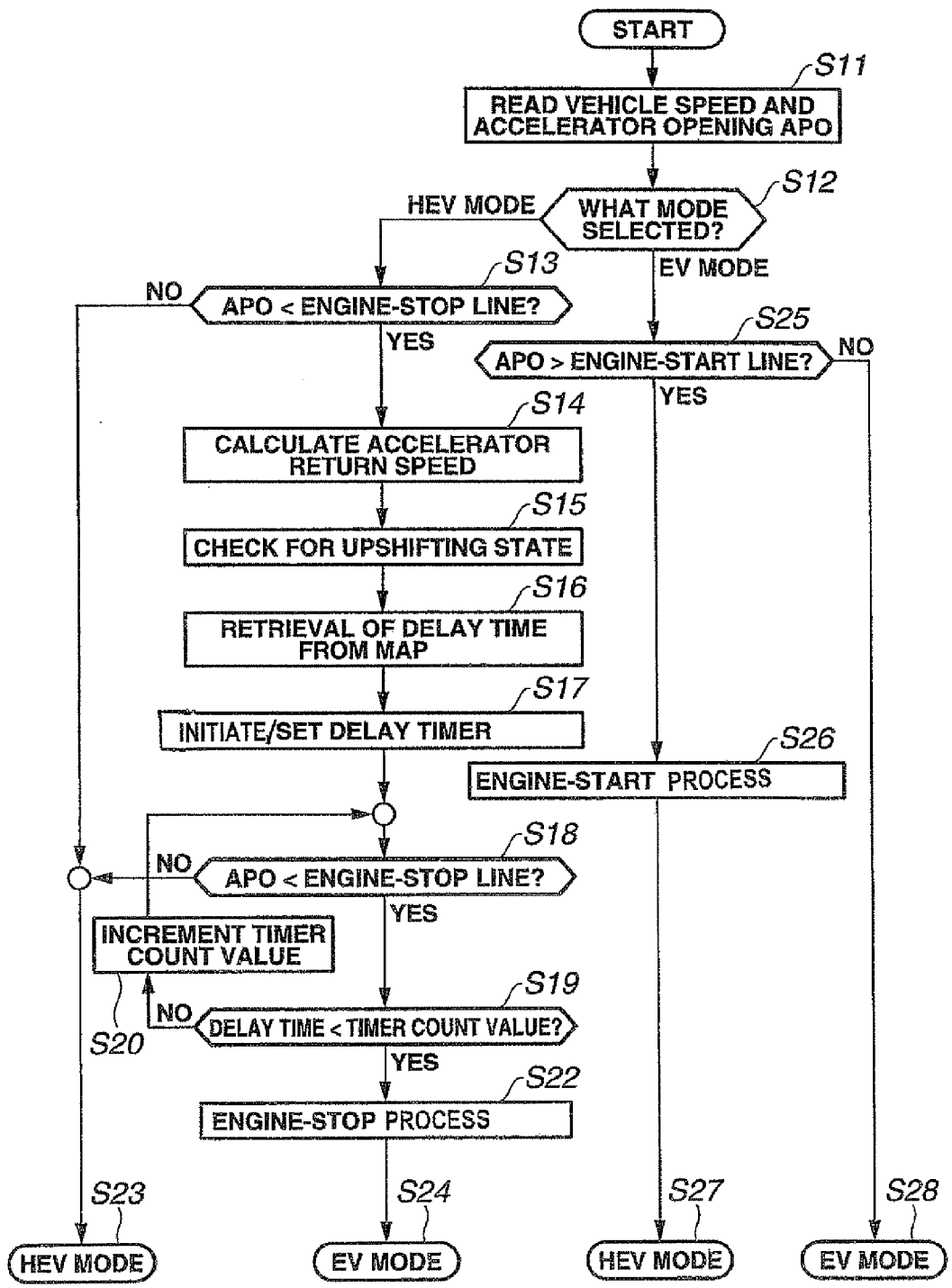
FIG. 7 is a flowchart illustrating a control routine executed using the map of FIG. 6

FIG. 7 is the flowchart illustrating the control routine executed using the map of FIG. 6. For the purpose of simplification of the disclosure, only the steps of the control routine of FIG. 7 differing from the control routine of FIG. 4 are hereunder described in detail. Note that at step S16 of FIG. 7, the map of FIG. 6 is used. Additionally, in the routine of FIG. 7, the processing executed at step S21 of the routine of FIG. 4 is not made. As can be appreciated, it is possible to set the delay time more suitably depending on various situations by utilizing the different map of FIG. 6 instead of using the map of FIG. 2. Hence, it is possible to effectively suppress a transition of the drive mode to occur during an upshift.

While the foregoing is a description of certain embodiments of the invention, functions and steps, may be rearranged logically without conflict. Also, a plurality of means and steps may be combined with each other or separated from each other.

That is, the above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A control apparatus of a hybrid vehicle including an engine, a motor/generator used for vehicle propulsion and power generation, a clutch interleaved between the engine and the motor/generator for enabling and disabling torque transmission by engagement and disengagement of the clutch and an acceleration demand detection device configured to detect a driving force demand from a driver, the control apparatus comprising:
a controller configured to:
selectively switch between an EV mode, in which the vehicle travels by only a driving force produced by the motor/generator with the clutch disengaged when the driving force demand is less than or equal to an engine-stop criterion value, and an HEV mode, in which the vehicle travels by at least a driving force produced by the engine with the clutch engaged when the driving force demand is greater than the engine-stop criterion value;
set a delay time at a time when the driving force demand becomes less than or equal to the engine-stop criterion value during the HEV mode, wherein the delay time is variable and set based at least in part on a change rate of the driving force demand at the time when the driving force demand becomes less than or equal to the engine-stop criterion, such that the delay time takes a lower value for lower driving force demand change rates; and
execute a transition from the HEV mode to the EV mode if the driving force demand is less than or equal to the engine-stop criterion value during the HEV mode and after the delay time has expired.

2. The control apparatus according to claim 1, wherein:
the controller is further configured to receive a vehicle speed signal indicating the vehicle speed of the hybrid vehicle and determine the delay time utilizing a map based on the vehicle speed and the driving force change rate.

3. The control apparatus according to claim 2, wherein:
the delay time takes a lower value when the vehicle speed is low.

4. The control apparatus according to claim 1, wherein the hybrid vehicle further includes a transmission interleaved between the motor/generator and drive road wheels; and wherein:
the controller is further configured to delay the transition to the EV mode from the HEV mode during an upshift process of the transmission that continues after the driving force demand change rate becomes greater than or equal to a specified rate value at a time that the driving force demand passes through the engine-stop criterion value, until the delay time has expired and the upshift process is complete.

5. The control apparatus according to claim 1, wherein the hybrid vehicle further includes a transmission interleaved between the motor/generator and drive road wheels; and wherein:
the controller is further configured to set the delay time to a longer time when an upshift of the transmission continues after the driving force demand change rate becomes greater than or equal to a specified value at a time that the driving force demand passes through the engine-stop criterion value.

6. The control apparatus according to claim 1, wherein:
the acceleration demand detection device comprises an accelerator opening position sensor configured to detect an accelerator opening as the driving force demand; and
the driving force demand change rate is an accelerator-pedal return speed detected by the accelerator opening sensor.

7. A method of controlling a hybrid vehicle including an engine, a motor/generator used for vehicle propulsion and power generation, a clutch interleaved between the engine and the motor/generator for enabling and disabling torque transmission by engagement and disengagement of the clutch and an acceleration demand detection device configured to detect a driving force demand from a driver, the method comprising:
selectively switching between an EV mode, in which the vehicle travels by only a driving force produced by the motor/generator with the clutch disengaged when the driving force demand is less than or equal to an engine-stop criterion value, and an HEV mode, in which the vehicle travels by at least a driving force produced by the engine with the clutch engaged when the driving force demand is greater than the engine-stop criterion value;
setting a delay time at a time when the driving force demand becomes less than or equal to the engine-stop criterion value during the HEV mode, wherein the delay time is variable and set based at least in part on a change rate of the driving force demand at the time when the driving force demand becomes less than or equal to the engine-stop criterion, such that the delay time takes a lower value for lower driving force demand change rates; and
executing a transition from the HEV mode to the EV mode when the driving force demand becomes less than or equal to the engine-stop criterion value during the HEV mode and after the delay time has expired.

8. The method according to claim 7, further comprising:
receiving a vehicle speed signal indicating the vehicle speed of the hybrid vehicle; and
determining the delay time utilizing a map based on the vehicle speed and the driving force change rate.

9. The method according to claim 8 wherein:
the delay time takes a lower value when the vehicle speed is low.

10. The method according to claim 7 wherein the hybrid vehicle further includes a transmission interleaved between the motor/generator and drive road wheels, the method further comprising:
delaying the transition to the EV mode from the HEV mode during an upshift process of the transmission that continues after the driving force demand change rate becomes greater than or equal to a specified rate value at a time that the driving force demand passes through the engine-stop criterion value, until the delay time has expired and the upshift process is complete.

11. The method according to claim 7 wherein the hybrid vehicle further includes a transmission, the method further comprising:

setting the delay time to a longer time when an upshift of the transmission continues after the driving force demand rate becomes greater than or equal to a specified value at a time that the driving force demand passes through the engine-stop criterion value.

12. The control method according to claim 7 wherein the acceleration demand detection device comprises an accelerator opening position sensor configured to detect an accelerator opening as the driving force demand, the method further comprising:

calculating the driving force demand change rate as an absolute value of a speed of change in the accelerator opening.

13. A control apparatus of a hybrid vehicle including an engine, a motor/generator used for vehicle propulsion and power generation, a clutch interleaved between the engine and the motor/generator for enabling and disabling torque transmission by engagement and disengagement of the clutch and an acceleration demand detection device configured to detect a driving force demand from a driver, the control apparatus comprising:

means for selectively switching between an EV mode, in which the vehicle travels by only a driving force produced by the motor/generator with the clutch disengaged when the driving force demand is less than or equal to an engine-stop criterion value, and an HEV mode, in which the vehicle travels by at least a driving force produced by the engine with the clutch engaged when the driving force demand is greater than the engine-stop criterion value;

means for setting a delay time at a time, when the driving force demand becomes less than or equal to the engine-stop criterion value during the HEV mode, wherein the delay time is variable and set based at least in part on a change rate of the driving force demand at the time when the driving force demand becomes less than or equal to the engine-stop criterion, such that the delay time takes a lower value for lower driving force demand change rates; and means for executing a transition from the HEV mode to the EV mode when the driving force demand becomes less than or equal to the engine-stop criterion value during the HEV mode and after the delay time has expired.

14. The control apparatus according to claim 13, further comprising:

means for receiving a vehicle speed signal indicating the vehicle speed of the hybrid vehicle; and means for determining the delay time utilizing a map based on the vehicle speed and the driving force change rate.

15. The control apparatus according to claim 14 wherein:

the delay time takes a lower value when the vehicle speed is low.

16. The control apparatus according to claim 13 wherein the hybrid vehicle further includes a transmission interleaved between the motor/generator and drive road wheels, the apparatus further comprising:

means for delaying the transition to the EV mode from the HEV mode during an upshift process of the transmission that continues after the driving force demand change rate becomes greater than or equal to a specified rate value at a time that the driving force demand passes through the engine-stop criterion value, until the delay time has expired and the upshift process is complete.

17. The control apparatus according to claim 13 wherein the hybrid vehicle further includes a transmission, the apparatus further comprising:

means for setting the delay time to a longer time when an upshift of the transmission continues after the driving force demand rate becomes greater than or equal to a specified value at a time that the driving force demand passes through the engine-stop criterion value.

18. The control apparatus according to claim 13 wherein the acceleration demand detection device comprises an accelerator opening position sensor configured to detect an accelerator opening as the driving force demand, the apparatus further comprising:

means for calculating the driving force demand change rate as an absolute value of a speed of change in the accelerator opening.

* * * * *